United States Patent [19]

Raphael

[11] 4,074,600
[45] Feb. 21, 1978

[54] ROTATION APPARATUS FOR WORK PIECES

[76] Inventor: Rouchdy B. Raphael, 319 Lyon NE., Grand Rapids, Mich. 49503

[21] Appl. No.: 685,623

[22] Filed: May 12, 1976

Related U.S. Application Data

[62] Division of Ser. No. 562,592, March 27, 1975, Pat. No. 3,995,521.

[51] Int. Cl.² ............................................. B26D 7/06
[52] U.S. Cl. .................................... 83/411 R; 83/439
[58] Field of Search ...................... 83/411 R, 439, 733; 198/624

[56] References Cited

FOREIGN PATENT DOCUMENTS

529,494   4/1977   United Kingdom .................. 83/439

Primary Examiner—Willie G. Abercrombie
Attorney, Agent, or Firm—Price, Heneveld, Huizenga & Cooper

[57] ABSTRACT

Apparatus for positioning the center points of circular arcs for accurately and precisely cutting such arcs in work pieces with band saws and the like. The device includes a base secured to the work support table of the saw and extending away from the saw blade. An arm is mounted at the end of the base, remote from the blade, and is spaced above the base. Also included are means with the arm for movably mounting a trammel point which engages and holds the center of the arc to be cut either on the work piece itself or on a holder therefor to determine the radius of the arc, as well as manual and power means for rotating the work piece about the trammel point.

12 Claims, 16 Drawing Figures

ROTATION APPARATUS FOR WORK PIECES

CROSS-REFERENCE TO RELATED APPLICATION

This is a division of application Ser. No. 562,592, filed Mar. 27, 1975, now U.S. Pat. No. 3,995,521.

BACKGROUND OF THE INVENTION

This invention relates to devices adapted for use with band saws and other saws having tables associated therewith for accurately cutting work pieces and, more particularly, to a device adapted to position the center of an arc to be cut in a work piece in order to cut the arc extremely accurately and precisely in all types of work pieces both large and small.

When cutting sheet stock and other work pieces on a band saw, circular table saw, or the like, it is often very difficult to guide the work piece in order to accurately cut the arc of a circle therein. The problem is accentuated with both extremely large and extremely small work pieces. With large work pieces, the piece extends off the typically small work support table provided with the saw and therefore must be simultaneously supported in a single plane in order to cut the edge at the required angle as well as rotated in a precise path in order to properly cut the circle or arc of a circle therein. With thicker sheet metal, the simultaneous performance of both of these actions is often impossible to accomplish with one saw operator. The necessity of additional help greatly increases the expense of cutting such pieces.

A related problem exists with extremely small work pieces in which arcs having extremely large radii must be cut. Although a smaller work piece can normally be supported by the existing work support table of the saw, it is extremely difficult to obtain an accurate, even cut along such a large radius arc merely by manually guiding the work piece against the cutting blade.

Various devices have been proposed to alleviate such problems of cutting arcs. Although some are secured to the work support table of the saw and include a screw or pin impressed into the work piece and about which the work piece is rotated against the cutting blade, a principal problem with these devices is their inability to sufficiently accommodate both extremely large and extremely small work pieces. Typically, support structure included with the apparatus prevents the cutting of larger pieces. Moreover, many of the structures require the center of the work piece be held against the existing work support table of the saw thereby severely limiting the size of the work piece which can be cut and providing an unstable support for those pieces which can be accommodated.

SUMMARY OF THE INVENTION

Accordingly, it is an object and purpose of the present invention to provide an apparatus for positioning the centers of circular arcs to be accurately and precisely cut in work pieces with band saws, table saws, and the like. The apparatus can accommodate both extremely large and extremely small work pieces while simultaneously providing a stable base for rotating all sizes of work pieces during cutting.

The invention is defined as an apparatus for positioning the center of a circular arc to be cut in a work piece with a band saw or the like, the saw being of the type including a cutting blade having a cutting edge and extending through a work support table. The apparatus includes base means for engaging the work table of the saw and supporting a work piece to be cut, the base means having a first end adapted to fit around the saw blade and a second end remote from the blade. Means for supporting the base means on the table are included. An arm is included extending toward the blade as well as support means rigidly mounted on the second, remote end of the base for supporting the arm in a cantilevered fashion spaced above the base and the work piece and for rigidly positioning the arm laterally at a right angle to the plane of the blade. Center point determining means are included on the arm for positioning the center point of the arc to be cut in the work piece against the base means. Means are provided for moving the center point determining means toward and away from the cutting edge of the blade to determine the length of the radius of the arc to be cut. When the center point is positioned, the work piece can be rotated about that center point to cut an extremely accurate, precise circular arc in the work piece.

In narrower aspects of the invention, means for slidably mounting a trammel point on a rigidly mounted arm are provided as well as means for slidably mounting the entire arm in which the trammel point is mounted. Further, for cutting arcs having large radii in extremely small work pieces, an adjustable work piece holding bracket is included for engagement by the trammel point.

In another aspect of the invention, manual and power rotation means are provided for smoothly and evenly rotating a work piece against a saw blade when positioned on the center point positioning apparatus. These rotation means, comprising either a cable and crank arrangement or a plurality of generally opposing work-engaging wheels powered by a motor, further aid the accuracy of the cuts made with the apparatus.

These and other objects, advantages, purposes, and features of the invention will become more apparent from a study of the following description taken in conjunction with the drawings.

DESCRIPTION OF THE PREFERRED EMBODIMENT

Figures 1, 2, 5:
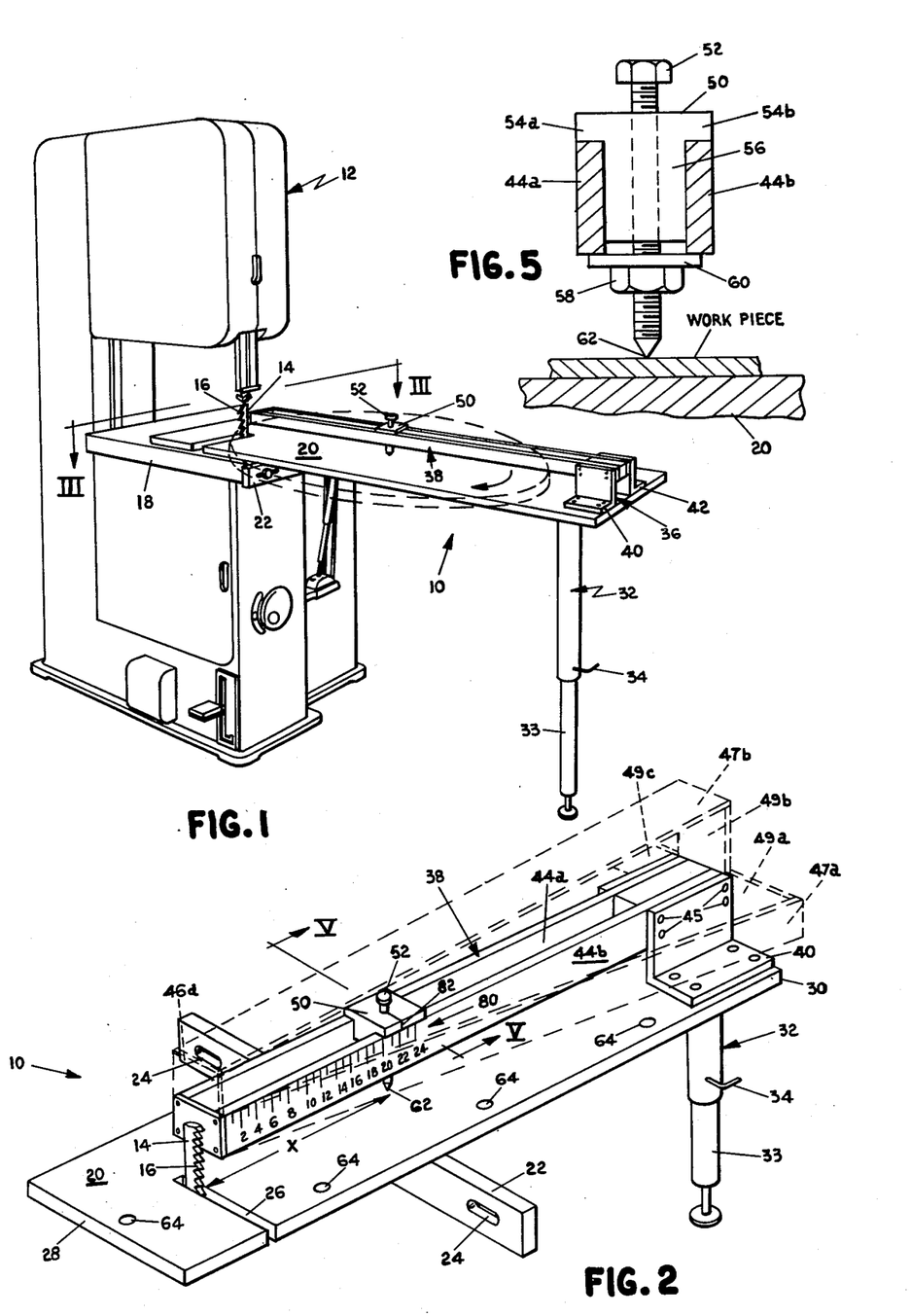
FIG. 1 is a perspective view of one embodiment of the center positioning device of the present invention shown secured to the work support table of a typical band saw.
FIG. 2 is a perspective view of the center positioning device of FIG. 1.
FIG. 5 is a sectional view of the arm including the slide member and trammel member taken along plane V—V of FIG. 2.

Referring now to the drawings in greater detail, FIG. 1 illustrates a first embodiment of the center positioning apparatus 10 adapted for use with band saws, circular table saws, and the like. In FIG. 1, the apparatus is illustrated with a typical band saw 12 having a generally vertically extending cutting blade 14 having a cutting edge 16, the blade being rotated and extending vertically through the work support table 18. As referred to herein, the plane of the saw blade will be understood to be parallel to the blade side surfaces, i.e., parallel to line B in FIG. 3. The plane of the cutting edge of the blade is generally perpendicular to the sides of the blade and vertical, i.e., parallel to line A in FIG. 3. Apparatus 10 provides an extension for the work support table 18 and overlies that work support table to provide a stable base for rotating both large and small work pieces about a center or trammel point provided on the arm included in the apparatus.

Figure 3:
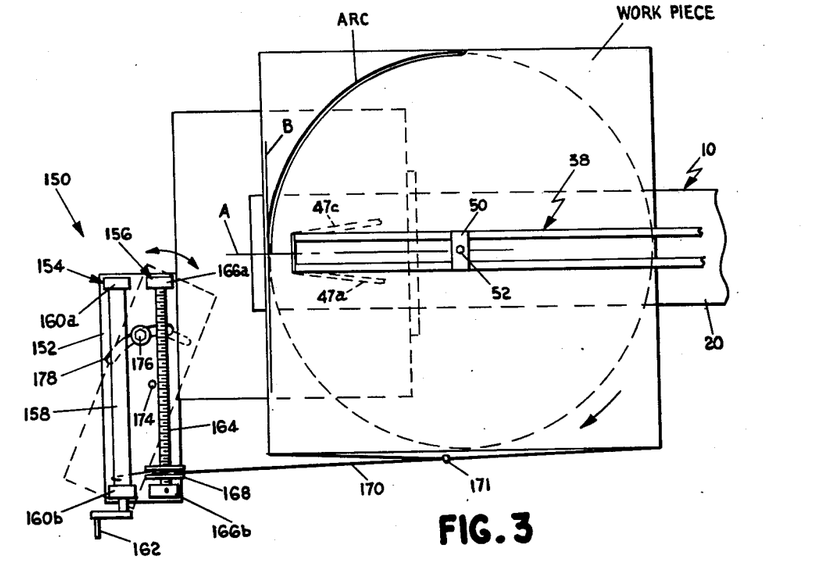
FIG. 3 is a fragmentary, plan view of the center positioning device secured to a band saw table taken along plane III—III of FIG. 1 which also illustrates a means for rotating the work piece about the trammel point and against the cutting edge of the saw blade.
Figure 4:
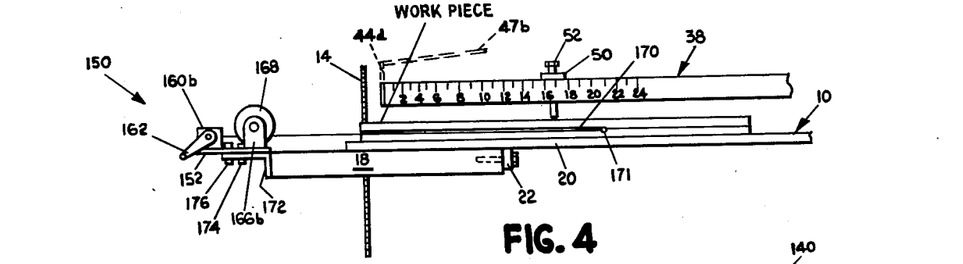
FIG. 4 is a fragmentary, side elevation of the apparatus shown in FIG. 3.

As shown in FIGS. 1–3, the first embodiment 10 of the center positioning apparatus includes an elongated, rectangular base plate 20 adapted to overlie the work support table 18. Plate 20 includes an attaching bar 22 secured to its underside such that it extends generally transverse to the elongated direction of the plate and lies generally parallel to the edge of table 18. Bar 22 includes a plurality of elongated apertures 24 through which securing bolts are passed to fasten the base plate atop table 18 as shown in FIGS. 1 and 4. A slot 26 extends into base 20 for receiving the saw blade 14 such that the plate extends beyond and substantially completely around the saw blade adjacent one end 28 thereof. The opposite or remote end 30 of the base plate is supported above a supporting surface by a leg 32 which is suitably secured with bolts or the like to the underside of end 30. Preferably, leg 32 is of the telescoping variety such that the apparatus can accommodate work support tables of varying height on different saws and includes a set screw 34 for locking telescoping, extendible section 33 in the desired position.

Mounted atop the remote end 30 of base plate 20 is an arm support assembly 36 for supporting arm 38 at a position spaced above and parallel to base plate 20. Arm 38 extends laterally toward cutting blade 14 generally at a right angle to the side surface of the blade. Support assembly 36 includes a pair of generally L-shaped upstanding support brackets 40, 42 between the upstanding legs of which are rigidly secured beams 44a and 44b forming arm 38. Beams 44a, 44b are parallel to one another and base plate 20 but are held above base 20 by bolts 45 and are spaced horizontally apart by spacer block 46 fitted between the upstanding legs of brackets 40, 42 and beams 44a, 44b. Bolts 45 are passed through the upstanding legs of brackets 40, 42 and the ends of beams 44a and 44b and spacer block 46 to secure arm 38 in its rigidly mounted position. Likewise, the horizontal legs of brackets 40, 42 are rigidly secured to the base by suitable bolts. The end of arm 38 includes a spacer plate 48 maintaining the beams in their parallel, spaced relationship forming a slot 49 for slidable mounting a trammel member therebetween.

As is best seen in FIGS. 2, 3, annd 5, slot 49 receives a slidably mounted T-block 50 in which is vertically threaded a suitable bolt or screw forming trammel member 52 extending through the block. Block 50 includes a pair of flanges 54a, 54b which slidably rest on the top surfaces of arm beams 44a, 44b and a body portion 56 which terminates above the bottom surfaces of those beams. A nut 58 forcing a washer 60 against the bottom surfaces of the beams 44a, 44b is threaded on the lower end of trammel member 52 to lock the T-block in the desired position after it has been slid along the top surfaces of the arm beams. The extreme lower end of trammel member 52 is tapered to a trammel point 62 which engages either the center of a large work piece or the center engaging member of the work holding bracket for smaller work pieces to position the center of the arc to be cut in the work piece.

in order to prevent movement of the supporting arm 38 during cutting operations, the plurality of rigid bracing members 47a through 47c may be secured between extending rigid members 49a through 49c secured to the rear or remote side of arm support assembly 36 as is shown in phantom in FIGS. 2 through 4. In order to provide room for sliding block 50 the full length of the arm, top rigid brace member 47b is secured to an upstanding rigid member 49d at the blade end of arm 38 in order to space the blade end of brace 47b above that end of the arm. Thus, the brace members rigidly retain center point 62 in its exact position without deflection of arm 38 such that the work piece will be rotated about the exact center point even when urged against the blade 14.

Figures 7, 11, 12:
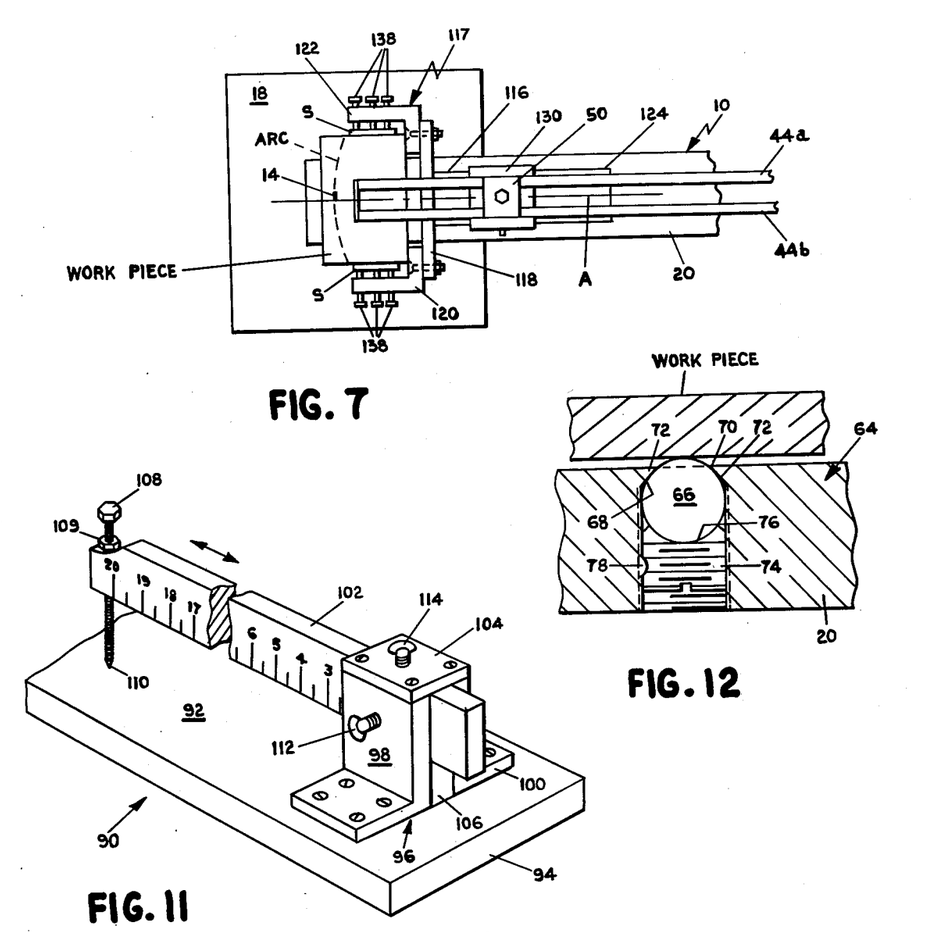
FIG. 7 is a fragmentary, plan view of the combination of the center positioning device of FIG. 1 and work holding bracket of FIG. 6 for rotating a small work piece against the cutting blade of the band saw.
FIG. 11 is a fragmentary, broken, perspective view of another embodiment of the center positioning means.
FIG. 12 is a sectional view with portions broken away showing a work piece support bearing recessed in the surface of the base of the center positioning device.

In order to accommodate extremely large and heavy work pieces, a plurality of work support bearings 64 are spaced about and recessed into the upper surface of base plate 20 as is shown in FIGS. 2 and 12. Each bearing 64 includes a metallic ball bearing 66 having its top surface slightly protruding above the upper surface of base plate 20 and recessed in a suitable aperture 68. Apertures 68 are bored from the bottom of base 20 but have an opening 70 smaller than the diameter of the main portion of apertures 68 formed by flanges 72. Ball bearing 66 protrudes through opening 70 and rotatably seats against the bottoms of flanges 72 and is held there by a recessed set screw 74. Set screw 74 includes a spherical, concave upper surface 76 allowing the ball 66 to rotate. The threads of the set screw and aperture include a nylon section or portion 78 for resisting rotation to lock the screw in place.

In order to cut a circular arc in a work piece larger than the work support table 18 with apparatus 10, the center of the circular arc is determined and marked on the work piece and the radius of that arc is measured.

The exact radius is measured off on a scale 80 provided on the exterior surface of at least one of the arm beams 44a, 44b as shown in FIG. 2. An aligning mark 82 which is in the same vertical plane with trammel point 62 is aligned with the mark on scale 80 for the predetermined radius for the arc to be cut. For example, a radius X equaling 16 inches from the cutting edge of the blade 14 is shown in FIG. 2. Scale 80 is marked off in increments spaced precisely from the arm side surface of the cutting blade such that the final cut edge on the work piece is exactly at the radius of the arc desired to be cut. Trammel point 62 is aligned in the same vertical plane with the leading edge of the cutting edge 16 of blade 14 (vertical plane A in FIG. 3), which plane extends laterally and perpendicularly away from the arm side surface of cutting blade 14 as shown in FIG. 3. Elongated apertures 24 in attaching bar 22 allow for such exact alignment. Accordingly, when T-block 50 is so positioned, trammel member 52 is rotated such that trammel point 62 engages and holds the center of the arc to be cut in the work piece against base 20 and nut 58 is tightened against the bottom of arm beams 44a, 44b to hold the T-block securely in position on the arm. Thereafter, the work piece may be rotated against the cutting edge of blade 14 by hand or with rotational apparatus as will be described hereinafter while base 20 stably supports the entire piece.

An alternative embodiment 90 of the center positioning apparatus is shown in FIG. 11. Embodiment 90 is similar in all respects to embodiment 10 except for the inclusion of a different means for moving the trammel point to engage and hold the center of the arc to be cut in a work piece. Embodiment 90 includes a base 92 having an end 94 spaced away from or remote from the cutting blade of the saw. Atop the base at the remote end is an arm support assembly 96 including a pair of spaced generally L-shaped support brackets 98, 100 between which is slidably secured arm 102. A capping plate 104 atop the upstanding legs of brackets 98, 100 retains the arm 102 therebelow and atop a spacing block 106. A trammel member comprising a screw or bolt 108 is threaded in a recess at the end of arm 102 closest to the saw blade and includes a trammel point 110 for engaging and holding the center of the arc to be cut in the work piece. A locking nut 109 is provided for clamping against the top surface of arm 102 to hold bolt 108 in place as adjusted. In order to move the trammel member 108 to accommodate various sizes of work pieces, the entire arm 102 including trammel member 108 is slid perpendicularly to the cutting edge of the saw blade as guided by plate 104, block 106, and brackets 98, 100 and secured in the desired position as determined by scale 111 along the exposed side of arm 102 via a plurality of set screws 112, 114. Scale 111 is reversed from scale 80 on arm 38 and also exactly measures the distance from the arm side surface of the saw blade to the center point.

Figures 6, 9, 10:
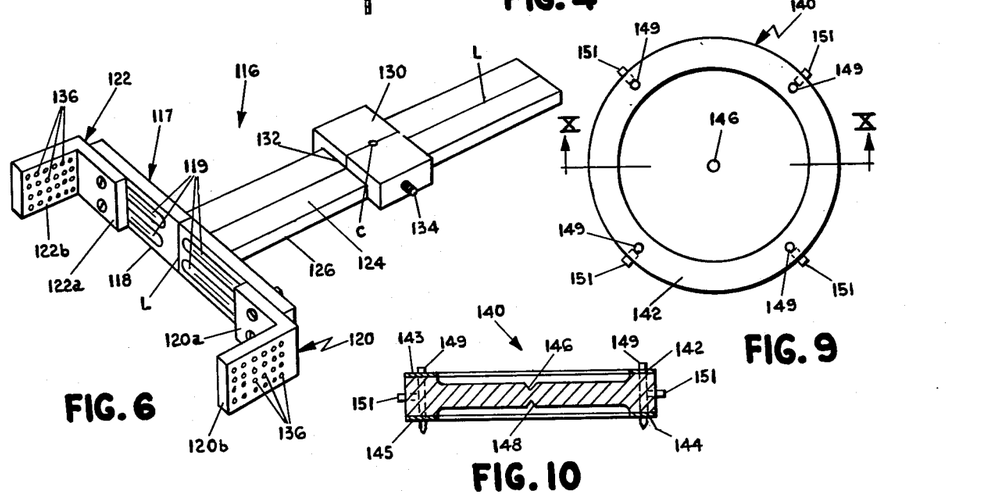
FIG. 6 is a perspective view of the work holding support bracket for smaller work pieces.
FIG. 9 is a plan view of the work piece engaging means shown in FIG. 8.
FIG. 10 is a sectional view of the work piece engaging means taken along plane X—X of FIG. 9.

As shown in FIGS. 6 and 7, a work holding bracket 116 for use in combination with either embodiment of the center positioning apparatus is provided for clamping work pieces in which circular arcs having radii so large that the centers therefore lie off the work piece are to be cut. Bracket 116 includes a generally C-shaped clamping or holding portion 117 having a back portion 118 and a pair of separate, spaced leg portions 120 and 122. Legs 120, 122 are L-shaped with portions 120a, 122a slidably secured to back 118 via bolts and elongated slots 119. Leg portions 120b, 122b extend parallel to one another and in the same direction from one side of the back portion. Extending perpendicularly away from the back portion 118 in the opposite direction from legs 120, 122 is a holding arm 124 which has its bottom surface 126 flush or coplanar with the bottom edges 128 of clamping portion 117. Thus, the holding bracket 116 will rest stably on a generally planar surface. Slidably mounted over the holding arm 124 is a center engaging channel block 130 having a channel 132 receiving the holding arm. A set screw 134 locks block 130 in a desired position to provide a desired radius for the arc to be cut in the work piece. A centering line L, used to align the center of the small work piece held in portion 117, extends along the center of the holding arm 124, the center of the clamping block 130, and over the center of the back portion 118 of the clamping portion 117. The center point C on block 32 is engaged by trammel points 62 or 110 when the bracket is used with the center positioning apparatus and slides along the center line L as shown in FIG. 6. Accordingly, center C and trammel points 62 or 110 are aligned in the same vertical plane A with the cutting edge 16 of blade 14 thereby properly positioning the radius of the arc to be cut in the work piece centered in clamping portion 117.

As shown in FIG. 7, a small work piece may be clamped between portions 120a, 122a of arms 120, 122 with a plurality of set screws 138 extending through threaded apertures 136 provided in each leg portion 120b, 122b. Also, legs 120, 122 are movable along slots 119 for clamping purposes. Shims S may be used to properly clamp and center the piece between the set screws and back portion 118 if necessary. A desired radius of the arc to be cut in the work piece is set with scales on arms 38 or 102 such that the trammel member and trammel point are properly positioned. Work holding bracket 116 including the clamped work piece is placed on base 20 such the center point C of channel block 130 is engaged by the trammel point 62. The holding arm 124 is slid through channel 132 until the work piece is properly positioned at the cutting edge of blade 14 to cut the desired arc in the work piece and is locked with screw 134. Bracket 116 is then rotated under the trammel point 62 to cut the desired arc as shown in FIG. 7. The work holding bracket is stably supported along its coplanar bottom surface by the base plate 20 as is the work piece clamped in clamping portion 117.

Figure 8:
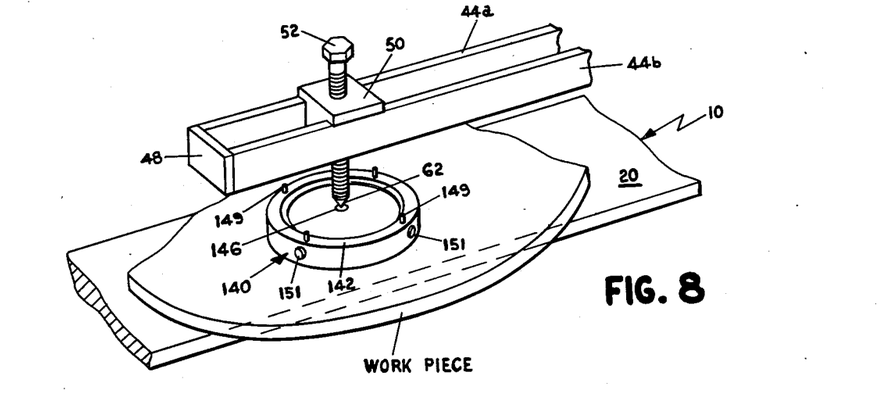
FIG. 8 is a fragmentary, perspective view of the center positioning device of FIG. 1 including a work piece engaging means preventing the marring and scratching of the work piece surface during cutting.

In order to prevent marring and scratching of the surfaces of highly finished work pieces, a work-engaging member 140 is provided as shown in FIGS. 8–10. Member 140 includes a circular plate body having raised, annular flanges 142, 144 on opposing, outer edge surfaces thereof. The flange surfaces are preferably planar and smooth. Plastic or rubber annular members 143, 145 are adhered to flange surfaces 142, 144 with cement, adhesive, or the like to enable better gripping of the work piece. Within the recessed central portions at the center of the circular body are cone-shaped detents 146 and 148, detent 146 being larger than detent 148 to accommodate different sized trammel points. Also, a plurality of work-engaging pins 149 are fitted through suitable apertures at spaced points about the center of the block and held in place by set screws 151. Each pin has a pointed end for lightly engaging and gripping the work piece surface to hold the block in position on the work piece. Member 140 is placed atop the work piece to be cut such that it lies between the trammel point and the work piece as shown in FIG. 8 with detents 146, 148 aligned with the center of the desired arc to be cut. The trammel member is then tightened down into the detent 146 and 148 such that the rubber or plastic layers 143, 145 on annular planar surface 142 or 144 and pins 149 tightly grip the work piece without scratching and marring the same. The work piece may then be rotated under the trammel point over the base plate 20 without noticeable marks or scratches being made on the piece during the cutting operation.

When cutting circles or arcs of circles in larger work pieces as shown in FIGS. 1 and 3, it is desirable to provide a mechanical feed to constantly and precisely feed the work piece into engagement with the cutting edge of blade 14. A pair of such rotational mechanisms 150 and 180 is shown in FIGS. 3 and 4 and 13–16, which mechanisms may be used alternatively.

Mechanism 150 is a manual apparatus including an elongated rectangular base 152 atop which are mounted a manual reel unit 154 and an even-wind unit 156. The reel includes an elongated axle 158 supported in suitable bearings between mounting blocks 160a and 160b and above plate 152, the axle extending through mounting block 160b and including an offset crank arm 162 for rotating the reel. Alternatively, an electric motor or the like suitably connected through speed reduction gears may be secured on base 152 and used to rotate the reel. Even-wind unit 156 includes a threaded rod 164 mounted in a fixed position parallel to reel axle 158 between mounting blocks 166a and 166b and above plate 152. A spool or pulley 168 is threaded on rod 164.

In order to rotate the work piece as shown in FIG. 3, an elongated flexible cable 170 or other flexible connector is wrapped at least twice around the edge of the work piece as shown in FIG. 4 with the final end being passed through a small ring 171 on the leading end of the cable, returned to the spool 168, wrapped once therearound and connected to the axle 158. Rotation of axle 158 with crank 162 winds the cable on axle 158 while simultaneously rotating and axially moving spool 168 along rod 164. Axial movement of spool 168 evenly winds cable 170 along the entire length of axle 158 while the work piece is rotated clockwise against the cutting edge 16 of blade 14 (FIG. 3). Base plate 152 is pivotally mounted on an L-shaped support bracket 172 secured to the edge of work support table 18 opposite the edge against which center-positioning apparatus 10 is secured as shown in FIG. 4. The top surface of bracket 172 is flush with the top surface of work table 18. Base 152 is pivotally secured about bolt 174 such that is can pivot to accommodate larger work pieces (FIG. 3). Pivoting is necessary to keep the reel and even-wind units 154, 156 generally transverse to the direction from which cable 170 is wound. A locking bolt 176, which passes through curved slot 178 in base 152, locks the entire base with respect to the bracket 172 as pivoted.

Alternatively, as shown in FIGS. 13–16, a powered, rotation apparatus 180 may be used to smoothly and evenly rotate the work piece into engagement with the cutting blade. Apparatus 180 includes a support plate 182 pivotally secured to a securing plate 184 adapted to engage base plate 20 of the center positioning device 10. Securing plate 184 includes flange members 186, 188 overlying the base plate 20 and providing a receptacle for allowing sliding movement of the plate 184 along the lengthwise edges of the base plate. Positioned within flange member 188 is an elongated bar or clamp member 190 secured by a pair of bolts extending through the side of flange member 188. Thus, different width bases 20 may be slidably received between members 186, 188 while clamping member 190 is used to adjust the width of the receptacle and allows the apparatus 180 to be easily slid along base 20. A clamping set screw 191 is threaded through plate 184 (FIG. 15) to secure plate 184 and apparatus 180 in the desired position along base 20.

Figure 13:
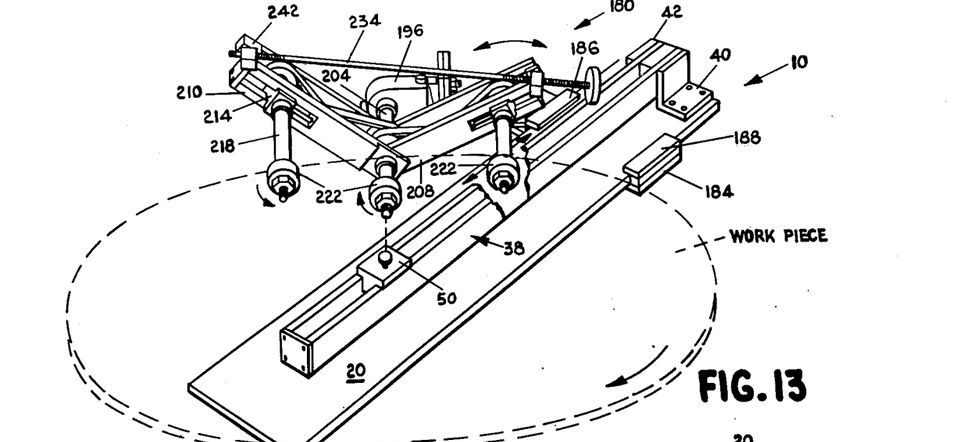
FIG. 13 is a perspective view of the center positioning device of FIG. 1 including another form of means for rotating the work piece about the center point determined by said device.
Figures 14, 15, 16:
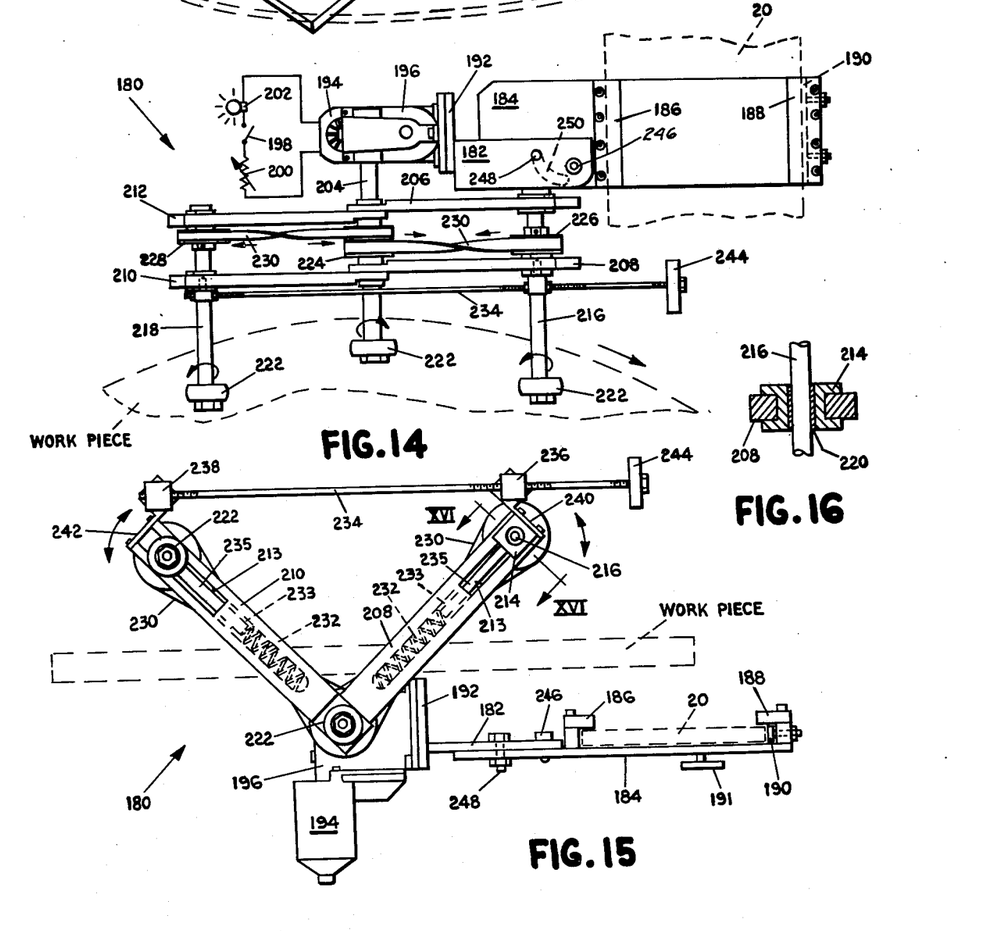
FIG. 14 is a plan view of the rotation means shown in FIG. 13.
FIG. 15 is a front elevation of the apparatus shown in FIG. 13 and 14.
FIG. 16 is a sectional view of the support apparatus for one of the follower shafts taken along plane XVI—XVI of FIG. 15.

Welded to the free end of pivot support plate 182 is a vertically oriented mounting plate 192 on which is bolted a power unit including electric motor 194 and an associated speed reduction gear box 196. Motor 194 is controlled by an electric circuit (FIG. 14) including a switch 198, a variable resistor or reheostat 200 to control the current flowing to the motor, and a warning light 202 for indicating when the motor is operating. Extending out of the speed reduction gear box 196 is a drive shaft 204 which supports the remainder of the rotation assembly 180. Journalled on ball bearings mounted on shaft 204 for pivotal movement or rotation about drive shaft 204 are two pair of parallel, follower shaft support arms 206, 208 and 210, 212 which extend radially outwardly from shaft 204. Each follower shaft support arm 206 through 212 includes an elongated slot 213 receiving a flanged bearing block 214 as shown in FIGS. 15 and 16. Cylindrical follower shafts 216, 218 are inserted through suitable bearings 220 in each bearing block 214 and extend between arms 206 and 208 and 210 and 212 such that follower shafts are rotatably supported parallel to drive shaft 204 on arms 206 through 212. On the free end of each of the follower shafts and drive shaft are mounted resilient work piece engaging wheels 222 for gripping and engaging opposite surfaces of a work piece as shown in FIGS. 13 and 15. Preferably, each wheel has a metallic hub surrounded by a circumferential or annular rubber tire.

In order to drive follower shafts 216, 218 in an opposite rotational direction from drive shaft 204 such that the opposing surfaces of a work piece are urged in the same direction, a belt drive means is provided. Drive shaft 204 includes a double pulley 224 while each follower shaft includes a follower pulley 226, 228. Resilient rubber or other material endless belts 230 extend around pulleys 224 through 228, each belt being twisted such that its opposite ends are inverted with respect to one another. Hence, the belt portion on top of drive shaft 204 crosses and passes beneath the pulley on the follower shaft such that drive shaft 204 imparts opposite rotational movement to the shafts 216, 218. The drive speed is quite slow preventing the contact of the belt portions at the crossing points from wearing out quickly. In order to maintain drive belt 230 in a taut condition, each slot 213 in support arms 208 through 212 includes a coil biasing spring 232 seated in a hole 233 extending from the bottom of slot 213. A rod or shaft 235 partially received in hole 233 is biased outwardly by spring 232 to engage and push bearing block 214 toward the free end of the arm. Each respective bearing block 214, and thus follower shafts 216, 218, is urged outwardly and away from drive shaft 204.

As shown in FIGS. 13 and 15, drive shaft 204 is positioned generally beneath and below the position of a work piece while follower shafts 216 and 218 are positioned above and over that work piece position. As is shown in FIG. 14, drive shaft 204 is shorter than follower shafts 216, 218 such that wheels 222 on the various shafts are supported in an arcuate pattern. Positioning of the wheels in this fashion maintains their proximity to the edge of the curved outline of such a work piece such that the wheels constantly grip the opposing surfaces adjacent that edge for a smooth and even rotation of the work piece.

To accommodate various thicknesses of work pieces such that wheels 222 may be brought into gripping engagement with opposite surfaces thereon, a threaded rod 234 extends between mounting blocks 236, 238 inserted via cylindrical studs into receiving brackets 240, 242 bolted to the ends of follower shaft support arms 208, 210. Rod 234 is supported for rotation in a fixed position in mounting block 238 while block 236 is threaded and moves axially along rod 234 as the rod is rotated via handle 244. Accordingly, in order to pivot support arms 208–212 and thus follower shaft and follower wheels 216, 218 and 222 into engagement with a work piece, rod 234 is rotated in one direction such that the support arms, follower shafts are simultaneously pivoted about the drive shaft to bring wheels 222 into engagement with the opposing surfaces of the work piece.

Support plate 182 is pivoted with respect to securing plate 184 via pivot pin or bolt 246 (FIGS. 14 and 115) in order to maintain the drive shaft 204 in general alignment with the position of the center point as shown in FIGS. 13 and 14. Also, sliding support plate 184 along base 20 helps adjust the position of apparatus 180 to accommodate different sized work pieces. The entire powered rotation means and support plate 182 are clamped in a desired pivoted position via clamping bolt 248 which extends through arcuate slot 250 and securing plate 184. Preferably, the speed of the electric motor 194 is reduced by conventional gears in the speed reduction gear box 196 such that the drive and follower shafts rotate at about 2.8 revolutions per minute. However, such speed may be further reduced using rheostat 200 to further slow the rotation of the work piece or, in fact, completely stop its operation. Alternately, the switch 198 may be used to shut off the apparatus.

The present center positioning apparatus, therefore, provides a simple, reliable apparatus for accurately and precisely cutting arcs of circles in either large or small work pieces with band saws, circular table saws, and the like. The spacing and cantilever support of arms 30a or 102 from a single support point at the remote end of the base plate 20 or 92 allows the apparatus to accommodate an extremely large range of work pieces. For small work pieces, a work holding bracket 116 provides the ability to cut large radius arcs with the same apparatus. The apparatus can be manufactured in various sizes to help accommodate different work pieces. The base plates 20, 92 which underlie the work pieces on both sides of the blade provide a stable support against which the center point of the work piece or work holding bracket is clamped for rotation of the work piece. Smooth, even cutting may be accomplished with the use of either manual rotation apparatus 150 or power-driven rotation apparatus 180 to rotate larger work pieces into contact with the blade cutting edge. p While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. Apparatus for positioning the center of a circular arc to be cut in a work piece with a band saw or other cutting tool or apparatus, the tool or apparatus being of the type including a work support table and a cutting means positioned to cut through a work piece supported by the work support table, said apparatus comprising:

base means for engaging the work table of the cutting tool or apparatus and supporting a work piece to be cut, said base means having a first end adapted to fit adjacent the cutting means, a second end remote from the cutting means, an arm extending toward the cutting means and support means mounted at a fixed position on said second end of said base for supporting said arm in cantilevered fashion spaced above said base and the work piece and for positioning said arm laterally generally at a right angle to the plane of said blade;

center point determining means on said arm for positioning the center point of the arc of the work piece to be cut against said base means and means for moving said center point determining means toward and away from the cutting means along and over said base means to determine the length of the radius of the arc to be cut in the work piece whereby when the center point of the arc to be cut on the work piece is so positioned, the work piece can be rotated about the center point to cut an extremely accurate, precise circular arc in the work piece;

rotation means for rotating a work piece to cut an arc therein including at least a pair of generally opposing wheels for engaging opposite surfaces of a work piece; means for rotating said wheels and thus the work piece including motive power means for simultaneously driving said wheels.

2. The apparatus of claim 1 wherein said rotation means includes a support and means for securing said support to said base means; motive power means secured to said support for rotating said wheels; shaft means extending from said motive power means for supporting said wheels, said shaft means including a drive shaft extending from said motive power means below the position of a work piece when mounted on said base means, two pair of shaft support arms journalled on said drive shaft and extending outwardly of said drive shaft in different directions, and a pair of spaced follower shafts, one follower shaft journalled in each of said pair of shaft support arms and extending above and over the said position of a work piece; said drive and support shafts being parallel to one another and each having a work piece engaging wheel mounted on the end thereof; means for rotating said pair of follower shafts in the opposite direction from that of said drive shaft such that said wheels will urge the opposing surfaces of the work piece in the same direction.

3. The apparatus of claim 2 including means for pivoting said support and thus said drive shaft with respect to said means for securing said support to said base means; said securing means including means for mounting said rotation means for sliding movement along said base means and means for clamping said rotation means in various positions along said base; and means for pivoting said pairs of shaft support arms and said follower shafts about said drive shaft for gripping various thicknesses of work pieces between said wheels. table and a cutting means positioned to cut through a work piece supported by the work support table, said apparatus comprising:

base means for engaging the work table of the cutting tool or apparatus and supporting a work piece to be cut, said base means having a first end adapted to fit adjacent the cutting means, a second end remote from the cutting means, an arm extending toward the cutting means and support means mounted at a fixed position on said second end of said base for supporting said arm in cantilevered fashion spaced above said base and the work piece and for positioning said arm laterally generally at a right angle to the plane of said blade;

center point determining means on said arm for positioning the center point of the arc of the work piece to be cut against said base means and means for moving said center point determining means toward and away from the cutting means along and over said base means to determine the length of the radius of the arc to be cut in the work piece whereby when the center point of the arc to be cut on the work piece is so positioned, the work piece can be rotated about the center point to cut an extremely accurate, precise circular arc in the work piece;

rotation means for rotating a work piece to cut an arc therein including at least a pair of generally opposing wheels for engaging opposite surfaces of a work piece; means for rotating said wheels and thus the work piece including motive power means for simultaneously driving said wheels.

4. Apparatus for positioning the center of a circular arc to be cut in a work piece with a band saw or the like, the saw being of the type including a cutting blade having a cutting edge and extending through a work support table, said apparatus comprising:

a base adapted to overlie the work support table of the saw and having a first end adapted to fit adjacent the saw blade, a second end remote from the blade, and means for supporting said base on the work support table;

an arm extending toward said blade and an arm support located at a fixed position at said second base end, said arm being mounted in cantilever fashion on said arm support such that it is spaced above said base and any work piece and is positioned laterally and generally at a right angle to the plane of the blade;

means for positioning the center of the circular arc to be cut in a work piece including a trammel member having a point thereon, means for slidably moving said trammel member along said arm toward and away from said blade, and means for locking said trammel member in various position along said arm to determine the radius of the arc to be cut whereby when the trammel point is positioned and establishes the center point of the arc to be cut, the work piece can be rotated about said point to cut an extremely accurate, precise circular arc in the work piece;

said arm including a pair of parallel, spaced beams defining a slot therebetween extending from said arm support to a position adjacent said blade cutting edge; a slide member slidably mounted in said slot and including said trammel member threadedly mounted therein and extending below said slide member and arm;

rotation means for rotating a work piece to cut an arc therein including a pair of generally opposing wheels for engaging opposite surfaces of a work piece; means for rotating said wheels and thus the work piece including motive power means for simultaneously driving said wheels.

5. Apparatus for rotating a work piece about a center point and against a cutting means comprising a support; means for securing said support to an apparatus for determining and positioning the center point of a work piece to be cut with a cutting means; a plurality of support shafts each having a work piece engaging wheel thereon; means for rotatably supporting one of said shafts above and the other of said shafts below the position of a work piece; means for driving said shafts and the wheels thereon in opposite directions; at least one of said shafts being rotatably supported in a fixed position with respect to the work piece position; support arm means for supporting the other of said shafts on said one fixed position shaft for pivotal movement about said one shaft; said other shaft being rotatably supported in said support arm means; and means for urging said other shaft, and thus its included wheel, toward the work piece position such that said wheels grip the work piece therebetween and rotate the same against the cutting means about the center point.

6. The apparatus of claim 5 wherein said drive means includes a motor secured to said support, said one fixed position shaft extending from and rotatably driven by said motor at a position below and beneath the work piece position; said support arm means including two pair of support arms journaled on said one shaft and extending radially outwardly therefrom, each pair of support arms rotatably supporting a follower shaft at a position above and over the work piece position, each follower shaft being parallel to said one shaft and having a work piece engaging wheel thereon; and said urging means including means for pivoting said support arms and follower shafts about said one shaft to bring them into gripping engagement with a work piece on opposite sides of a work piece.

7. Apparatus for rotating a work piece about a center point against a cutting means comprising a support; means for securing said support to an apparatus for determining and positioning the center point of a work piece to be cut with a cutting means; a plurality of support shafts each having a work piece engaging wheel thereon; means for rotatably supporting one of said shafts above and the other of said shafts below the position of a work piece; and means for driving said shafts and the wheels thereon in opposite directions such that said wheels grip said work piece and rotate the same against the cutting means about the center point; said drive means including a motor secured to said support, one of said shafts extending from and rotatably driven by said motor at a position below and beneath the work piece position; two pair of support arms journaled on said one shaft and extending radially outwardly therefrom, each pair of support arms rotatably supporting a follower shaft at a position above and over the work piece position, each follower shaft being parallel to said one shaft and having a work piece engaging wheel thereon; and means for pivoting said support arms and follower shafts about said one shaft to bring them into gripping engagement with a work piece on opposite sides of a work piece; means for pivotally securing said support on said securing means such that said one shaft can be aligned with the center point of the work piece; a drive belt extending from said one shaft to each of said follower shafts for rotating said follower shafts with said one shaft, each belt being crossed such that said follower shafts are driven in the opposite direction from said one shaft; means for slidably mounting said follower shafts on said support arm pairs; and means for biasing said follower arms away from said one shaft to keep said drive belts taut.

8. Apparatus for rotating a work piece about a center point against a cutting means comprising a support; means for securing said support to an apparatus for determining and positioning the center point of a work piece to be cut with a cutting means; a plurality of support shafts each having a work piece engaging wheel thereon; means for rotatably supporting one of said shafts above and the other of said shafts below the position of a work piece; and means for driving said shafts and the wheels thereon in opposite directions such that said wheels grip said work piece and rotate the same against the cutting means about the center point; said drive means including a motor secured to said support, one of said shafts extending from and rotatably driven by said motor at a position below and beneath the work piece position; two pair of support arms journaled on said one shaft and extending radially outwardly therefrom, each pair of support arms rotatably supporting a follower shaft at a position above and over the work piece position, each follower shaft being parallel to said one shaft and having a work piece engaging wheel thereon; and means for pivoting said support arms and follower shafts about said one shaft to bring them into gripping engagement with a work piece on opposite sides of a work piece; said means for pivoting said support arms and follower shafts about said one shaft including a threaded rod extending between said pairs of support arms and means for rotatably attaching said rod to at least one of said support arms in each pair.

9. The apparatus of claim 6 wherein said one fixed position shaft is shorter than said follower shafts such that said work piece engaging wheels are arranged in an arcuate fashion to grip the work pieces adjacent any arcuate edge thereon.

10. Apparatus for rotating a work piece about a predetermined point comprising a support; means for securing said support adjacent said predetermined point; a plurality of support shafts each having a work piece engaging wheel thereon; means on said support for rotatably supporting one of said shafts on one side of the position of a work piece to be rotated and the other of said shafts on the other side of the said position of a work piece; means for driving said shafts and the wheels thereon in opposite direction; at least one of said shafts being rotatably supported in a fixed position with respect to the work piece position; support arm means for supporting the other of said shafts on said one fixed position shaft for pivotal movement about said one shaft; said other shaft being rotatably supported in said support arm means; and means for urging said other shaft, and thus its included wheel, toward the work piece position such that said wheels grip said work piece therebetween and rotate the same about said predetermined point.

11. The apparatus of claim 5 including three parallel support shafts each having a work piece engaging wheel thereon; a first of said three shafts being rotatably supported in said fixed position with respect to the work piece position; said support arm means including first and second separate arm means for rotatably supporting said second and third support shafts; each of said separate arm means being pivotally mounted on said first support shaft and rotatably supporting one of said second and third support shafts; said urging means including means for urging said second and third support shafts away from one another and toward the said position of the work piece.

12. The apparatus of claim 10 including three parallel support shafts each having a work piece engaging wheel thereon; a first of said three shafts being rotatably supported in said fixed position with respect to the work piece position; said support arm means including first and second separate arm means for rotatably supporting said second and third support shafts; each of said separate arm means being pivotally mounted on said first support shaft and rotatably supporting one of said second and third support shafts; said urging means including means for urging said second and third support shafts away from one another and toward the same position of the work piece.

* * * * *

UNITED STATES PATENT AND TRADEMARK OFFICE
CERTIFICATE OF CORRECTION

PATENT NO. : 4,074,600
DATED : February 21, 1978
INVENTOR(S) : ROUCHDY B. RAPHAEL It is certified that error appears in the above-identified patent and that said Letters Patent are hereby corrected as shown below:

Column 4, Line 14:

"slidable" should be --slidably--.

Column 4, Line 33:

"in" should be --In--.

Column 9, Line 61:

After "edge." please delete --p--.

Column 10, Line 19:

"cantilivered" should be --cantilevered--.

Column 11, Lines 1-34:

After "wheels." please delete --table and a . . . driving said wheels.--.

Column 11, Line 57:

"position" should be --positions--.

UNITED STATES PATENT AND TRADEMARK OFFICE
CERTIFICATE OF CORRECTION

PATENT NO. : 4,074,600
DATED : February 21, 1978
INVENTOR(S) : ROUCHDY B. RAPHAEL It is certified that error appears in the above-identified patent and that said Letters Patent are hereby corrected as shown below:

Column 14, Line 8:

"direction" should be --directions--.

Column 14, Line 44:

"same" should be --said--.

Signed and Sealed this

Nineteenth Day of September 1978

[SEAL]

Attest:

RUTH C. MASON
Attesting Officer

DONALD W. BANNER
Commissioner of Patents and Trademarks